Jan. 25, 1966  A. F. ANDERSON  3,230,783
SAFETY APPARATUS FOR TURNING SHAFTS
Filed Dec. 28, 1962  2 Sheets-Sheet 1

INVENTOR.
ALFRED F. ANDERSON
BY
ATTORNEY

Jan. 25, 1966   A. F. ANDERSON   3,230,783
SAFETY APPARATUS FOR TURNING SHAFTS
Filed Dec. 28, 1962   2 Sheets-Sheet 2

*INVENTOR.*
ALFRED F. ANDERSON
BY
ATTORNEY

United States Patent Office 3,230,783
Patented Jan. 25, 1966

3,230,783
SAFETY APPARATUS FOR TURNING SHAFTS
Alfred F. Anderson, East Hartford, Conn.
(% Mico Mfg. Co., 640 Hilliard St., Manchester, Conn.)
Filed Dec. 28, 1962, Ser. No. 248,102
8 Claims. (Cl. 74—54)

The present invention relates to safety apparatus for effecting partial rotation of the shaft of a press or the like.

In the course of setting up or trying out press tools on a press of the geared or flywheel type, it is necessary to rotate the crankshaft over a portion of the press cycle for the proper positioning of the press ram. Generally, presses have been provided with an aperture extending through one end of the crankshaft into which a press bar is inserted to provide the leverage needed for sufficient torque to rotate the shaft manually. Occasionally, the press has been actuated while the press bar has been inadvertently left in the aperture, and the press bar will rotate with the shaft until thrown by centrifugal force, thus endangering life and property both during rotation with the shaft and when thrown therefrom.

It is an object of the present invention to provide apparatus for turning the shaft of a press over a limited portion of the press cycle with a minimum of danger to life and property.

Another object is to provide such apparatus which may be conveniently and effectively used by the press operator and which is simple and effective in operation.

Yet another object is to provide such apparatus wherein the torque applicator will automatically disengage from the rotating shaft during its initial rotation if inadvertently left in engagement therewith.

It is also an object to provide such apparatus which is relatively simple and inexpensive to manufacture and which may be readily and simply installed or adapted to various existing presses.

Other objects and advantages will be readily apparent from the following detailed description and claims and the attached drawings wherein:

Figure 1:
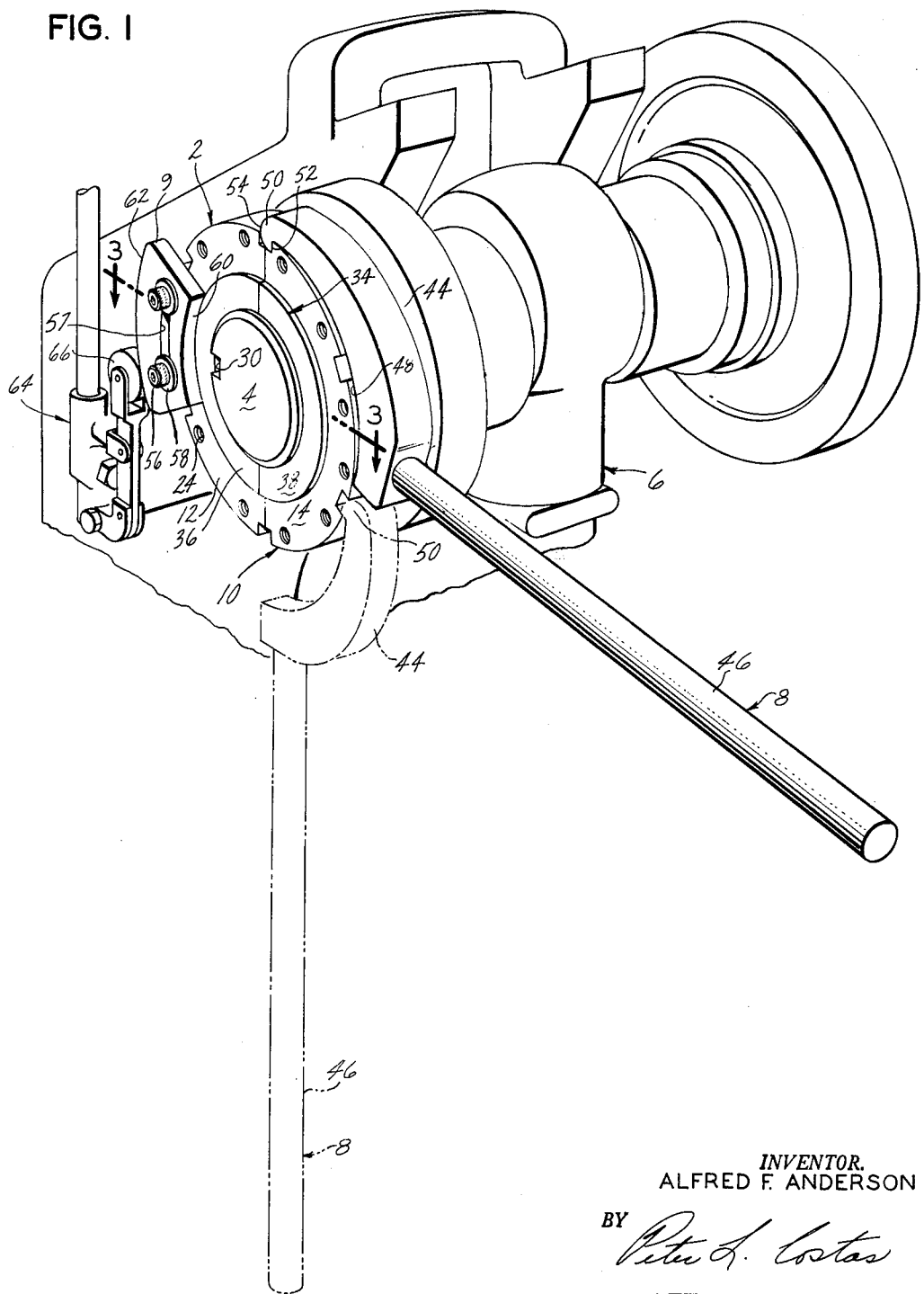
FIGURE 1 is a fragmentary perspective view of a press of the flywheel type having mounted thereon safety apparatus for turning the shaft embodying the present invention.

It has been found that the foregoing and related objects can be readily attained by safety apparatus for turning the shaft of a press comprising a collar assembly and a torque applicator which is readily disengageable therefrom. The collar assembly has an aperture extending therethrough adapted to receive snugly the shaft of a press and is adapted to be mounted on a shaft in driving engagement therewith. In its outer periphery, the collar assembly is provided with an aperture extending generally radially thereof. The torque member which is engageable with the collar assembly has a grip portion with an inner face configured to extend about a portion of the outer periphery of the collar assembly and a projection on the inner face engageable in the aperture in the outer periphery of the collar assembly. Extending from the outer face of the grip portion is an elongated handle portion spaced from the projection so that the torque applicator may be firmly engaged with the collar assembly to impart torque and rotation to a shaft upon which the apparatus is mounted, and may be readily disengaged therefrom by the action of gravity and inertia upon initial rotation of the shaft during operation of the press.

In using the apparatus, the collar assembly is mounted on the press shaft and drivingly engaged therewith. The torque applicator is positioned with the inner face of the grip portion upon the outer periphery of the collar assembly and with the projections thereof engaged in an engagement aperture in the outer periphery of the collar assembly. As force is applied adjacent the outer end of the handle portion, torque is transmitted to the collar assembly and shaft until the shaft has rotated to the desired position. If the press should be inadvertently operated while the torque applicator is still engaged with the collar assembly, the torque member will disengage and fall therefrom during its initial movement, thus minimizing the likelihood of injury to the operator, other personnel or property.

In a preferred aspect of the invention, the collar assembly has two generally semi-circular components which are drawn tightly together by threaded means to form a substantially annular split collar assembly firmly engaged upon the shaft. To limit still further any tendency towards relative movement of the collar assembly upon the shaft, the split collar assembly is provided with a key projecting inwardly from the inner periphery thereof for engagement in an aperture or slot keyway in the shaft.

The outer periphery of the split collar assembly has a plurality of notches spaced thereabout and the torque applicator may engage in the notch which is most convenient for the operator, thus effecting a saving of time and energy for the operator in locating the applicator and in effecting the force necessary for rotation. The outer face of the projection on the grip portion of the torque applicator tapers or is inclined outwardly from the inner face so as to effect a unidirectional engagement within a notch in the outer periphery of the collar assembly; thus, the torque applicator will tend to slip out of engagement with the collar assembly substantially immediately if the press should be actuated inadvertently while the torque applicator is still engaged with the collar assembly and will fall of its own weight rather than be forceably rotated by the shaft and thereafter propelled outwardly by centrifugal force. For mounting the split collar on shafts of lesser diameter than that of the inner periphery of the split collar split ring adapters may be fitted concentrically within the split collar and interlocked therewith against relative rotation, thus rendering the safety apparatus capable of widespread application on shafts of varying diameters and on presses of existing manufacture.

For added versatility of operation, one side of the split collar is provided with a plurality of axial threaded apertures spaced thereabout. A cam member may be mounted on the split collar by means of threaded fasteners received within these axial apertures. The cam member projects beyond the outer periphery of the split collar and affords convenient cyclical actuation of air valves to operate apparatus associated with the press such as ejection, feeding or cleaning apparatus.

Referring now in detail to FIGURE 1 of the attached drawings, safety apparatus for turning shafts and embodying the present invention has a collar assembly 2 which is drivingly mounted on the crankshaft 4 of a flywheel press which is fragmentarily illustrated and generally designated by the numeral 6. A torque applicator generally designated by the numeral 8 is shown in full line as engaged with the collar assembly 2 for imparting rotation to the shaft 4 in a clockwise direction. Also shown is a cam member 9 fastened to the side of the collar assembly for a purpose to be described hereinafter.

Figure 2:
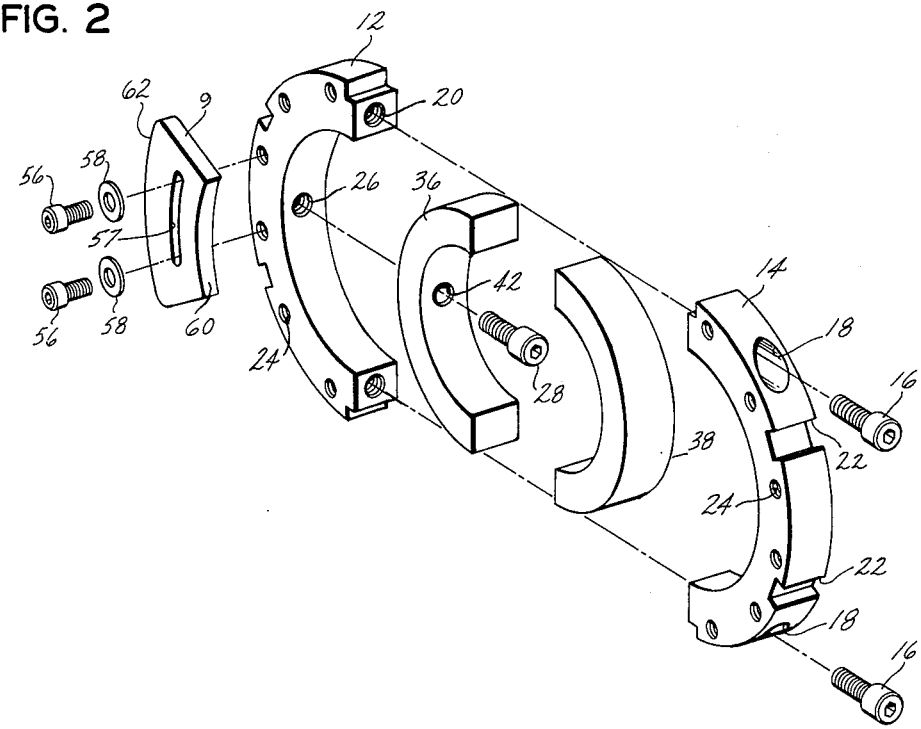
FIGURE 2 is an exploded view of the collar and arm assembly of the safety apparatus of FIGURE 1.
Figure 3:
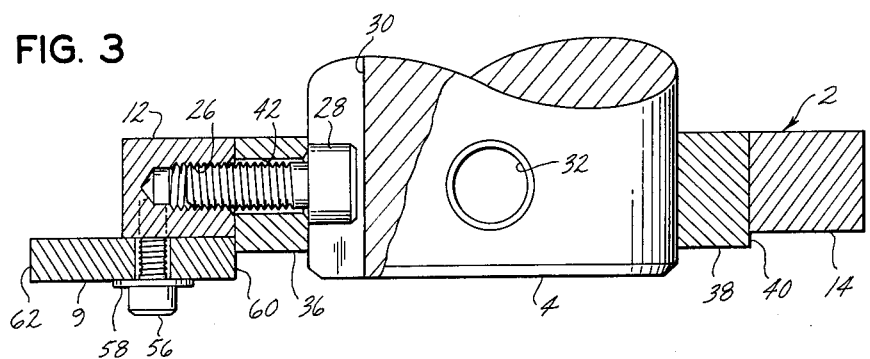
FIGURE 3 is a cross-sectional view to an enlarged scale along the line 3—3 of FIGURE 1.

Turning first to the construction of the collar assembly 2, there is a substantially annular split collar 10 formed by a pair of substantially semi-circular components 12, 14 and which forms the outer component of the assembly. As best seen in FIGURE 2, the ends of the semi-circular components 12, 14 are drawn together and held in engagement upon a shaft by threaded fasteners 16 which extend chordally in a pair of unthreaded apertures 18 in the component 14 and threadably engage in the threaded apertures 20 of the component 12. The unthreaded apertures 18 have an enlarged diameter outer portion to receive and seat the head of the fasteners 16. Spaced about the outer periphery of the split collar 10 are a plurality of notches or apertures 22 which extend generally radially inwardly thereof and spaced about the outer side face are a plurality of axially extending threaded apertures 24. The split collar 10 also has a radially extending threaded aperture 26 in the inner periphery in which a threaded fastener 28 engages to provide a key or locking member for engagement in an aperture on the crankshaft 4. As shown in FIGURE 3, some shafts have both an axially extending slot 30 and a radial aperture 32 in either of which the key 28 may be seated to prevent relative rotational movement.

In the illustrated embodiment, the split collar assembly 2 includes a substantially annular split ring adapter 34 comprised of a pair of substantially semi-circular ring components 36, 38 so as to adapt the collar assembly 2 to a shaft of lesser diameter than that of the opening therethrough. The adapter 34 is of greater axial length than the axial length of the split collar 10 to provide an axially projecting shoulder indicated by the numeral 40 at the inner periphery of the split collar 10 and a radial aperture 42 extends through the component 36 and slidably receives the shank of the threaded fastener or key 28.

In assembling the collar assembly 2 using an adapter ring, the radial aperture 42 in the adapter ring component 36 is axially aligned with the radial threaded aperture 26 in the split collar component 10 so that the shank portion of a key 28 of sufficient length will threadably engage in the radial aperture 26 in the split collar component 12, and the head portion will project inwardly from the inner periphery of the split ring adapter 34 to engage in the keyway 30 or radial aperture 32 provided in the end of a shaft 4 to effect a firm driving engagement therewith, thus preventing relative rotation between the split collar 8 and the shaft 4. Since the shank portion of the key 28 extends through the radial aperture 42 in the adapter component 36 and threadably engages in the radial threaded aperture 26 in the split collar component 12, the key 28 also prevents relative rotation between the split collar 10 and split ring adapter 34.

Referring now to the torque applicator 8 as illustrated in FIGURE 1, it is comprised of a grip portion 44 engageable with the collar 10 and an elongated handle portion 46 which extends generally radially outwardly of the collar and provides the mechanical advantage for easy manual rotation of the shaft 4. The grip portion 44 has a generally arcuate inner face 48 and is dimensioned to extend along about one-fourth of the outer periphery of the split collar 10. At one end of the inner face 48 of the grip portion 44 is a projection 50 engageable in one of the notches or apertures 22 in the outer periphery of the split collar 10. The inside face 52 of the projection 50 extends chordally of the split collar so as to abut firmly against the cooperating side face of the aperture 22 and the outside face 54 tapers outwardly away from the inside face 52 for unidirectional engagement in the notch or aperture 22. In this manner, the projection 50 may readily slip out of the aperture 22 in the event the torque applicator 8 is inadvertently left in engagement with the split collar 10 by the action of gravity and inertia thereon upon initial rotation of the shaft 4.

To add to the utility and versatility of the present invention, the cam member 9 is mounted on the collar assembly 2 by threaded fasteners 56 which extend through the elongated arcuate slot 57 and engage in the axial threaded apertures 24 therein and lock washers 58. The cam member 9 has an inner radial face 60 of arcuate configuration determined by the same radius as the inner periphery of the split collar 10 so as to be substantially aligned therewith and to abut against the shaft 4 or, if the split ring adapter 34 is used, the axially projecting shoulder 40 for radial stability of the cam member 9. The outer radial face 62 of the cam member 9 projects outwardly of the outer periphery of the split collar 10 and cyclically actuates the air valve assembly 64 by camming the lever-mounted roller 66 thereof to operate ancillary apparatus in accordance with conventional practice.

Referring now to the operation of the apparatus as illustrated in the attached drawings, the shaft 4 has a diameter less than that of the inner periphery of the split collar 10 and, accordingly, a split ring adapter 34 having the appropriate inner peripheral diameter is coaxially seated within the split collar 10. The key 28 is inserted through the radial aperture 40 in the adapter component 36 and threadably engaged in the radial threaded aperture 26 in the split collar 10 to align the split ring adapter 34 with the axial shoulder 40 projecting from the outer side of the split collar 10 having axial threaded apertures 24. The collar assembly 2 is loosely mounted on the shaft 4 with the projecting or head portion of the fastener key 28 engaged in the keyway provided by axial slot 30, or radial aperture 32 if so desired, in the shaft 4. The threaded connectors 16 are tightened to effect a tight, driving engagement between the collar assembly 2 and the shaft 4. If it is desired to actuate a switch or valve assembly during continuing operation of the press, the cam member 9 may be mounted on the split collar 10, the plurality of spaced axial threaded apertures 24 in the collar 10 and elongated slot 57 in the cam member 9 permitting fine adjustment of cam member 9 to project from any portion of the outer periphery of the split collar 10.

The press 6 can be operated normally with the collar assembly mounted on the shaft 4. However, when it is necessary to rotate the shaft a small amount for positioning dies or tools, the torque applicator 8 is engaged with the outer periphery thereof which is most convenient for projection 50 is engaged in that aperture 22 or notch in the outer periphery thereof which is most convenien fotr leverage to the press operator who, by exerting force on the handle portion 46, rotates the press crankshaft until the press ram is properly positioned. In FIGURE 1, the torque applicator 8 is shown in position for rotating the shaft 4 in a clockwise direction. However, to rotate the shaft in a counterclokwise direction, the grip portion 44 is engaged in the then lower portion of the split collar 10 and the outer end of the handle portion 46 is pushed in an upward direction. In both instances, the torque applicator will almost immediately disengage during initial rotation of the shaft in the event it is inadvertently left on the collar.

The semi-cirular components of the split collar and split ring and the grip portion of the torque applicator can be readily machined or cast, and are economically fabricated from low carbon steel. The handle portion of the torque applicator is easily fabricated from steel tubing and secured to the outer face of the grip portion by welding or other suitable means. To allow the threaded fasteners to be fully seated within the periphery of the split collar, they preferably have a prismatic axial aperture in the head for turning by a corresponding prismatic rod inserted therein.

To provide maximum versatility, the split collar is generally bored to receive a shaft having a diameter of 4 inches and the annular split ring adapter is made in a variety of radial widths to fit many smaller shaft diameters.

As previously indicated, the projecting head portion of the key fastener is also adapted to snugly fit in the shaft aperture generally provided for the press bar if an axial keyway is not provided in the shaft. However, such an axial keyway may be conveniently machined in the shaft if so desired. The length of the shank portion of the key should be long enough to permit a secure threaded engagement in the radial aperture in the inner periphery of the split collar and, accordingly, the length of the shank portion will generally vary to accommodate the radial thickness of any split ring adapter which may be used.

Thus, it can be seen that safety apparatus for turning shafts constructed in accordance with the present invention enables a press operator to position the press ram with a minimum of danger to life and property, while also providing optimum convenience and optimum effectiveness. The apparatus is relatively simple and economical to manufacture and is quickly and easily installed upon existing presses. The unidirectional engagement between the torque applicator and the collar assembly causes the torque applicator to automatically disengage from the rotating shaft during its initial rotation, thus effectively eliminating the likelihood of any injury due to inadvertence.

Although but one specific embodiment of the invention has been shown and described herein, it will be understood that modifications may be made within the spirit of the invention.

Having thus described the invention, I claim:

1. Safety apparatus for turning the shaft of a press and the like comprising a substantially annular split collar comprised of substantially semi-circular components and adapted to receive the shaft of a press in the aperture therethrough and to enter into driving engagement therewith, said split collar having a plurality of apertures spaced about the outer periphery thereof and extending generally radially thereof and an aperture in the inner periphery thereof extending generally inwardly thereof; a pair of chordally extending threaded connectors engaged with the ends of said generally semi-circular components for effecting tight engagement thereof upon a shaft; a key threadably received in said aperture in the inner periphery and projecting inwardly from the inner periphery of said split collar to engage in an aperture of an associated shaft for firm driving engagement therewith; a torque applicator engageable with said split collar having a grip portion extending along the outer periphery thereof with a generally arcuate inner face and a projection at one end thereof engageable in one of said apertures in said outer periphery, said applicator having a handle portion projecting generally radially outwardly from the outer face of said grip portion at the other end thereof whereby said torque applicator may be engaged with said collar to impart torque and rotation to a shaft of an associated press upon which it is mounted and may be readily disengaged therefrom by the action of gravity and inertia upon initial rotation of the shaft during operation of the press.

2. The apparatus of claim 1 wherein the grip portion of said torque applicator extends along about one-fourth of the outer periphery of said split collar.

3. Safety apparatus for turning the shaft of a press and the like comprising a substantially annular split collar comprised of substantially semi-circular components and adapted to receive the shaft of a press in the aperture therethrough and to enter into driving engagement therewith, said split collar having a plurality of apertures spaced about the outer periphery thereof and extending generally radially thereof and an aperture in the inner periphery extending generally radially thereof; a pair of chordally extending threaded connectors engaged with the ends of said generally semi-circular components for effecting tight engagement thereof upon a shaft; a substantially annular split ring adapter concentrically disposed within said split collar and having a radial aperture therethrough aligned with the radial aperture in the inner periphery of said split collar; a key extending through the radial aperture in said split ring adapter and received in the radial aperture in the inner periphery of said split collar to prevent relative rotation between said split collar and said split ring adapter, said key projecting inwardly from the inner periphery of said split ring adapter to engage in an aperture in the shaft of an associated press to effect firm driving engagement therewith; and a torque applicator engageable with said split collar having a grip portion extending along the outer periphery thereof with a generally arcuate inner face and a projection at one end thereof engageable in one of said apertures in said outer periphery, said applicator having a handle portion projecting generally radially outwardly from the outer face of said grip portion at the other end thereof whereby said torque applicator may be engaged with said collar to impart torque and rotation to a shaft of an associated press upon which it is mounted and may be readily disengaged therefrom by the action of gravity and inertia upon initial rotation of the shaft during operation of the press.

4. Safety apparatus for turning the shaft of a press and the like comprising a substantially annular split collar comprised of a pair of substantially semi-circular components and adapted to receive the shaft of an associated press in the aperture therethrough and to enter into driving engagement therewith, said split collar having a plurality of apertures spaced about the outer periphery thereof and extending generally radially thereof and an aperture in the inner periphery extending generally radially thereof, and said split collar having a plurality of axially extending threaded apertures spaced about one side face thereof; a pair of chordally extending threaded connectors engaged with the ends of said semi-circular components for effecting tight engagement thereof upon a shaft; a key received in said aperture in the inner periphery and projecting inwardly from the inner periphery of said split collar to engage in an aperture in the shaft of an associated press to effect firm driving engagement therewith; a cam member; threaded fasteners engaged in said axially extending threaded aperture and mounting said cam with a portion projecting outwardly of the outer periphery of said split collar, said cam member having an arcuate inner radial face substantially aligned with the inner periphery of said split collar; and a torque applicator engageable with said split collar having a grip portion extending along the outer periphery thereof with a generally arcuate inner face and a projection at one end thereof engageable in one of said apertures in said outer periphery, said applicator having a handle portion projecting generally radially outwardly from the outer face of said grip portion at the other end thereof whereby said torque applicator may be engaged with said collar to impart torque and rotation to a shaft of an associated press upon which it is mounted and may be readily disengaged therefrom by the action of gravity and inertia upon initial rotation of the shaft during operation of the press.

5. Safety apparatus for turning the shaft of a press and the like comprising a substantially annular split collar comprised of a pair of substantially semi-circular components and adapted to receive the shaft of an associated press in the aperture therethrough and to enter into driving engagement therewith, said split collar having a plurality of apertures spaced about the outer periphery thereof and extending generally radially thereof; a pair of chordally extending threaded connectors engaged with the ends of said semi-circular components for effecting tight engagement thereof upon an associated shaft; a substantially annular split ring adapter concentrically disposed within said split collar assembly and having an axial length greater than that of said split collar to provide a substantially annular axially projecting shoulder at the inner periphery of said split collar; a cam member mounted on a side face of said split collar and projecting outwardly of the outer periphery of said split collar, said cam member having an arcuate inner radial face substantially aligned with the inner periphery of said split collar and abutting against the shoulder provided by said split ring adapter for radial stability; and a torque applicator engageable with said split collar having a grip portion extending along the outer periphery thereof with a generally arcuate inner face and a projection at one end thereof engageable in one of said apertures in said outer periphery, said applicator having a handle portion projecting generally radially outwardly from the outer face of said grip portion at the other end thereof whereby said torque applicator may be engaged with said collar to impart torque and rotation to a shaft of an associated press upon which it is mounted and may be readily disengaged therefrom by the action of gravity and inertia upon initial rotation of the shaft during operation of the press.

6. Safety apparatus for turning the shaft of a press and the like comprising a substantially annular split collar assembly comprised of substantially semi-circular components adapted to receive the shaft of a press in the aperture therethrough and to enter into driving engagement therewith, said split collar assembly having chordally extending connectors therein engaged with the ends of said semi-circular components for drawing said substantially semi-circular components thereof into tight rotation-free engagement upon a shaft and having an aperture in the outer periphery extending generally radially inwardly thereof; and a torque applicator engageable with said collar assembly and having a grip portion with a generally arcuate inner face configured to extend about a portion of the outer periphery of said collar assembly and a projection adjacent one end thereof engageable in said radially extending aperture of said collar assembly, said torque member having a handle portion spaced from said projection on the inner face and projecting generally radially outwardly from the outer face of said grip portion adjacent the other end thereof, whereby said torque member may be engaged with said collar assembly to impart torque and rotation to a shaft upon which it is mounted and may be readily disengageable therefrom by the action of gravity and inertia upon initial rotation of the shaft during operation.

7. The apparatus of claim 6 wherein said split collar assembly includes a pair of interlocked concentric split rings and a key portion projecting radially inwardly of the inner of said split rings for engagement in an aperture of the shaft of an associated press and the like to effect firm driving engagement therewith.

8. Safety apparatus for turning the shaft of a press and the like comprising a substantially annular split collar assembly comprised of substantially semi-circular components adapted to receive the shaft of a press in the aperture therethrough and to enter into driving engagement therewith, said split collar assembly having chordally extending connectors therein engaged with the ends of said semi-circular components for drawing said substantially semi-circular components thereof into tight rotation-free engagement upon a shaft and having an aperture in the outer periphery extending generally radially inwardlly thereof; a cam member engaged on the side of said collar assembly and projecting beyond the outer periphery thereof to activate auxiliary mechanism on an associated press during rotation of the shaft thereof; and a torque applicator engageable with said collar assembly and having a grip portion with a generally arcuate inner face configured to extend about a portion of the outer periphery of said collar assembly and a projection adjacent one end thereof engageable in said radially extending aperture of said collar assembly, said torque member having a handle portion spaced from said projection on the inner face and projecting generally radially outwardly from the outer face of said grip portion adjacent the other end thereof, whereby said torque member may be engaged with said collar assembly to impart torque and rotation to a shaft upon which it is mounted and may be readily disengageable therefrom by the action of gravity and inertia upon initial rotation of the shaft during operation.

References Cited by the Examiner
UNITED STATES PATENTS

| | | | |
|---|---|---|---|
| 2,225,064 | 12/1940 | Lukacs | 29—400 |
| 2,830,480 | 4/1958 | Brame | 81—90 |
| 2,896,315 | 7/1959 | Dubberke | 29—400 |
| 2,940,344 | 6/1960 | Taylor | 81—90 |
| 2,982,162 | 5/1961 | Golden | 81—90 |
| 3,008,363 | 11/1961 | Cook | 81—90 |
| 3,117,476 | 1/1964 | Stein | 81—90 |
| 3,142,186 | 7/1964 | Melton et al. | 74—54 |

WHITMORE A. WILTZ, *Primary Examiner.*

THOMAS H. EAGER, *Examiner.*